United States Patent
Nakada et al.

[11] Patent Number: 5,770,792
[45] Date of Patent: Jun. 23, 1998

[54] SHOCK SENSORS

[75] Inventors: Tsutomu Nakada; Akira Fuse; Yoshiyuki Sugiyama; Yuji Tsuda; Okihiro Iwaki, all of Kanagawa, Japan

[73] Assignee: Nippon Aleph Corporation, Kanagawa, Japan

[21] Appl. No.: 738,699

[22] Filed: Oct. 28, 1996

[30] Foreign Application Priority Data

Oct. 27, 1995 [JP] Japan ................................. 7-280756
Dec. 18, 1995 [JP] Japan ................................. 7-328753
Dec. 27, 1995 [JP] Japan ................................. 7-340747

[51] Int. Cl.$^6$ ........................... G01P 15/02; H01H 35/14
[52] U.S. Cl. ..................... 73/12.01; 340/467; 335/207; 335/205
[58] Field of Search .................... 73/12.01; 335/205, 335/207; 116/203; 340/436, 467

[56] References Cited

U.S. PATENT DOCUMENTS

| | | |
|---|---|---|
| 3,622,926 | 11/1971 | Risk . |
| 3,795,780 | 3/1974 | Lawrie . |
| 4,705,922 | 11/1987 | Seeger et al. . |
| 4,877,927 | 10/1989 | Reneau ................................. 335/205 |
| 4,980,526 | 12/1990 | Reneau . |
| 4,987,276 | 1/1991 | Bader et al. . |
| 5,194,706 | 3/1993 | Reneau ................................. 335/205 |
| 5,212,357 | 5/1993 | Reneau ................................. 335/205 |
| 5,283,420 | 2/1994 | Green . |
| 5,326,945 | 7/1994 | Gotoh et al. ......................... 335/205 |
| 5,416,293 | 5/1995 | Reneau ................................. 335/205 |
| 5,440,084 | 8/1995 | Fuse et al. ........................... 335/205 |

FOREIGN PATENT DOCUMENTS

| | | |
|---|---|---|
| 50-141044 | 12/1975 | Japan . |
| 2-203276 | 8/1990 | Japan . |
| 4-49868 | 4/1992 | Japan . |
| 5-288764 | 11/1993 | Japan ................................. 73/12.01 |

*Primary Examiner*—Ronald W. Biegel
*Attorney, Agent, or Firm*—Staas & Halsey

[57] ABSTRACT

A shock sensor including a magnetic reed switch extending in a direction in which shocks are to be detected, a member movable along the magnetic reed switch due to the shocks and including a magnet for imparting a magnetic force to the magnetic reed switch to turn on the magnetic reed switch, a coil spring for biasing the moving member toward one side of the magnetic reed switch, and an adjuster for adjusting the time duration in which the magnetic reed switch is on. The adjuster also reduces the moving speed of the moving member of adjusts the turn-on time when the magnetic reed switch is turned on.

17 Claims, 6 Drawing Sheets

SHOCK SENSORS

BACKGROUND OF THE INVENTION

The present invention relates to sensors which use a magnetic reed switch which senses shocks imparted to the body of a vehicle, for example in a vehicle's accident, to start up safety protection systems for the driver and passengers such as air bags and/or seat belts. In addition, the present invention relates to protection systems for the driver and passengers having a sensor for sensing such shocks.

Conventionally, many such sensors (which can each be hereinafter referred to as a "shock sensor"use a magnetic reed switch constructed as shown in FIG. 1. In FIG. 1, the shock sensor 1 includes a housing 2 attached to the vehicle body, a hollow cylindrical switch case 3 provided so as to extend along the longitudinal axis of the vehicle body, a magnetic reed switch 4 inserted in the switch case 3, a hollow cylindrical magnet 5 fitted over the switch case 3 slidably along the longitudinal axis of the switch case 3, and a coil spring 6 which biases the magnet 5 leftward in FIG. 1. Two terminals 4a and 4b of the magnetic reed switch 4 are connected to a detector (not shown) via leads (not shown).

In FIG. 1, the magnet 5 has a reduced diameter hollow right-hand portion 5a to thereby provide a shoulder 5b with which the coil spring 6 is engaged at its left-hand end to thereby bias the magnet 5 leftward.

When the vehicle is at a stop or travels at regular speeds with the shock sensor 1 being attached to the vehicle body, the shock sensor is subjected to little high acceleration. Thus, the magnet 5 abuts a stop 3a provided at the left end of the switch case 3 by the resiliency/tension of the coil spring 6. Thus, the magnet 5 deviates considerably in longitudinal midpoint from the magnetic switch 4 provided in the switch case 3. Thus, the reed switch 4 is in the "off" state because its contacts are not substantially influenced by the magnetic force of the magnet 5.

When, for example, the vehicle is suddenly stopped due to an accident occurring during traveling and shocks are imparted to the vehicle body, the magnet begins moving, for example rightward, as shown by an arrow A in FIG. 1. Thus, the magnet 5 is subjected to a considerably high negative acceleration in a direction opposite to the direction shown by arrow A. Thus, the magnet 5 is subjected to a rightward inertial force as shown by the arrow relative to the switch case 3 due to the inertial mass thereof.

Thus, the magnet 5 moves rightward along the switch case 3 against the tension of the coil spring 6. When the magnet force from the magnet 5 acting on the contacts of the magnetic reed switch 4 exceeds a predetermined value, the switch 4 is turned "on" (that is, its contacts are closed).

Thereafter, when the vehicle stops and the acceleration of the magnet 5 decreases below the predetermined value, the magnet 5 cannot withstand the tension of the coil spring 6 and it moves leftward in the switch case 3 to return to its initial position due to the coil spring 6.

When the magnetic force of the magnet 5 acting on the switch contacts decreases below the predetermined value, the switch contacts are turned off.

Thus, the magnetic reed switch 4 maintains its on state only between being turned on and being turned off. This on state is detected by the detector (not shown) to start up the air bags and seat belt systems (not shown) to ensure the safety of the driver and passengers in the vehicle.

In order to ensure the operation of all the systems including the air bags, etc., the shock sensor 1 has been required to maintain its on-time duration longer.

The assembling of the shock sensor and adjustment of the turn-on timing in the shock sensor 1 are as follows. In assembling, the coil spring and the hollow magnet 5 are fitted from the left in this order over the switch case 3, and the stop 3a is then attached from the left to the left end of the switch case 3. A magnetic reed switch assembly 7 which includes the terminals 4a and 4b on which the magnetic reed switch 4 is attached, as shown in FIG. 2, is then inserted into the switch case 3.

In this state, the magnetic reed switch assembly 7 is moved right and left in FIG. 1 within the switch case 3 to thereby turn on the magnetic reed switch 4. An appropriate position of the magnetic reed switch 4 within the switch case 3 is obtained on the basis of the position where the magnetic reed switch 4 is turned on, and the magnetic reed switch 4 is then placed at the appropriate position. Thereafter, the terminals 4a and 4b are spot welded to terminal frames (not shown) of the switch case 3 to terminate the on-point adjustment of the sensor 1.

In another assembling method the magnetic reed switch assembly is first inserted into the switch case 3 and the terminals 4a and 4b are spot welded to the terminal frames of the switch case 3. The coil spring 6 and the magnet 5 are then fitted from the left over the switch case 3. Then, the magnet 5 is moved to turn on the magnetic reed switch 1. The appropriate initial position of the magnet 5 is obtained on the basis of the turn-on position of the magnetic reed switch 1. A stop 3a having such a thickness that the magnet 5 assumes the appropriate initial position is then attached fixedly to the magnet 5.

In order to improve the performance of the air bags, etc., higher accuracy shock sensors, in which variations in the on timing are reduced, have been demanded. When shock sensors are used for side air bags for protection from side collisions of vehicles, higher accuracy magnetic reed switches, whose "rise" times taken from the beginning of shocks to the magnetic reed switch to the on timing of the magnetic reed switch are reduced, have been demanded.

Thus, the coil spring 6 needs to be better than in conventional shock sensors, but a coil spring 6 which satisfies such standards would be required to be newly designed, the yield of the coil springs 6 would be reduced, and the cost would increase accordingly.

Also the sensor assembly which has been adjusted with reference to its on-timing and not yet inserted into the housing 2 is actually subjected to shocks to examine its rise time. When the magnetic reed switch 4 or the magnet 5 is re-adjusted with reference to position on the basis of the result of the examination, the spot-welded portion of the magnetic reed switch 4 is removed, the setting position of the magnetic reed switch 4 is adjusted, and the magnetic reed switch is again spot-welded or a new stop 3a having a selected thickness is fixed. Thus, much time is consumed to examine the shock sensor.

The rise time depends greatly on the moving distance of the magnet 5. When the rise time is shorter, it much more depends on the moving distance of the magnet 5.

SUMMARY OF THE INVENTION

It is an object of the present invention to provide a shock sensor which is operated reliably in response to shocks.

Another object of the present invention is to provide a shock sensor which is capable of sensing shocks without fail.

Still another object of the present invention is to provide a shock sensor which prolongs the on time due to shocks compared to the conventional shock sensor to ensure the operation of a safety system.

A further object of the present invention is to provide a shock sensor which facilitates the re-adjustment of a rise time to provide a high accuracy rise time even when the rise time is short, without needing to revise parts of the shock sensor such as the coil spring.

A still further object of the present invention is to provide a protection system for a driver and/or a passenger in a vehicle, the protection system including a shock sensor of the type mentioned above.

In order to achieve the above objects, the shock sensor according to the present invention includes an adjuster for adjusting the on time duration in which the magnetic reed switch is on. The adjuster includes a reducer for reducing the moving speed of the moving member (e.g. magnet) or for adjusting the time when the magnetic reed switch is turned on.

The reducer includes interaction portions of the coil spring and the moving member which form a small spacing between the coil spring and the moving member with the coil spring abutting the spring stop. The reducer may include a radical projection provided on the outer periphery of the moving member at the opposing end of the moving member from the spring stop so as to form a small spacing between the coil spring and an outer end of the radial projection with the coil spring abutting the spring stop over the radial projection.

In an embodiment, the spring stop is bonded to the moving member. The spring stop may be integral with the moving member. In another embodiment, the distance between the spring stop and the opposite end of the moving member from the spring stop is selected so as to be more than the completely compressed axial length of the coil spring. The reducer provides for a difference between the inner diameter of the coil spring and the outer diameter of the moving member in a range of 0.1 to −0.05 mm.

In a further embodiment, the radial projection is annular extends around the end of the moving member. Preferably, the radial projection comprises a plurality of spot-type radial projection provided at equal angles around the periphery of the end of the moving member. Preferably, the radial projection on the moving member has a shape gradually decreasing radially outward. More preferably, the radial projection takes the form of a semicircle, a triangle or a trapezoid.

The reducer provides that the distance between the coil spring and the radial projection is selected in a range of 0.1 to −0.05 mm.

In order to adjust the moment when the magnetic reed switch is turned on, the adjuster includes a spacer through which the moving member abuts the spring stop. Preferably, the spacer has an appropriate axial thickness. More preferably, the spacer includes a C-like ring made of a metal wire having a resiliency or a C-like washer. Preferably, the spacer is composed of a magnetic material and, by the magnetic means, is drawn to an adjacent end of the moving member.

In addition, the present invention provides a system such as an air bag and/or a seat belt for protecting a driver and/or a passenger in a vehicle, the system having a shock sensor mentioned above.

According to the present invention, when a traveling vehicle in which the inventive shock sensor is attached to the vehicle body is stopped suddenly, the moving member is moved against the tension of the coil spring due to the inertial mass thereof. Thereafter, when the acceleration acting on the moving member decreases below the predetermined value, the moving member is returned to its original position by the tension of the coil spring.

Since the coil spring is fitted over the moving member, for example the magnet, with a small spacing of preferably 0.1 to −0.5 mm and more preferably 0.1 to 0 mm therebetween, friction and/or a slight interference may occur between the coil spring and the magnet or the radial projection(s) when the coil spring moves to the position where the magnetic reed switch is turned on, and when the coil spring returns to its original position.

Thus, the moving speed of the magnet due to shocks is reduced by the friction and/or small interference, the on time duration of the magnetic reed switch is maintained longer, and the system control devices for the air bags and/or seat belts are operated without fail. This arrangement is simple because only the shape of the moving member of the conventional shock sensor is changed and hence it is manufactured at a relatively low cost.

Since in the present invention the outer periphery of the radial projection provided at the end of the moving member is brought into contact with the inner surface of the coil spring to reduce the moving speed of the moving member, the moving speed of the moving member is reduced without fail, even if the inner diameter of the coil spring slightly deviates from the desired standards. Thus, selection of a coil spring having an acceptable inner diameter is not required to thereby improve the yield of the coil springs.

When the radial projection has as a cross section, for example, a semicircle, triangle or trapezoid, which decreases gradually outward, the coil spring is not stopped by the interference of, or engagement with, the radial projection when the moving member moves, and the moving member can move relatively smoothly.

The spring stop is beforehand bonded to, or integral with, the moving member or magnet. Thus, they are not required to be assembled with each other in the assembling process for the shock sensor.

When the distance between the spring stop and the opposite end of the moving member from the spring stop is selected so as to be greater than the completely compressed axial length of the coil spring, the number of coils of the spring involved in possible friction produced due to engagement with the moving member during the movement of the moving member increases and hence the friction increases. Thus, the on time duration is further increased in addition to the action of the radial projection.

According to the present invention, the moving member normally abuts at one end through the spacer on the spring stop by the tension of the spring. Thus, by adjusting the axial dimension or thickness of the spacer appropriately, the position of the moving member relative to the magnetic reed switch is adjusted.

Thus, the moving distance of the moving member from its initial position to the position where the magnetic reed switch is turned on when subjected to shocks is adjusted appropriately. By replacing the spacer with another spacer having an appropriate axial thickness, the turn-on point adjustment is easily achieved. Thus, only by changing and adjusting a spacer as required to adjust the moving distance of the moving member without selecting strictly other respective parts concerned, a high accuracy rise time is easily achieved even when the rise time is short.

When the spacer is either a C-like metal wire having a resiliency or a C-like washer, the spacer itself can be formed easily at inexpensive cost.

When the spacer is made of a magnetic material and magnetically drawn to one end of the moving member, the spacer moves along with the moving member. Thus, when the moving member moves due to shocks, the spacer does not hinder the moving member from moving smoothly.

Other features and advantages of the present invention will be apparatus from the following description taken in conjunction with the accompanying drawings, in which like reference characters designate the same or similar parts throughout the figures thereof.

DESCRIPTION OF THE PREFERRED EMBODIMENTS

Preferred embodiments of a shock sensor according to the present invention will be described with respect to the accompanying drawings.

Figure 3:
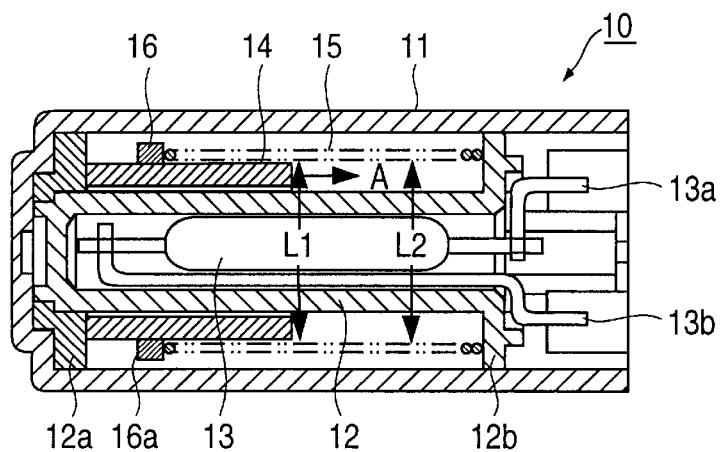
FIG. 3 is a longitudinal cross-sectional view of a first embodiment of a shock sensor according to the present invention.

FIG. 3 shows a first embodiment of the inventive shock sensor. The shock sensor 10 includes a housing 11 attached, for example, to a vehicle body, a hollow switch case 12 provided within the housing 11 so as to extend in a direction in which shocks are detected, for example, in the longitudinal direction of the vehicle body, a magnetic reed switch 13 disposed in the switch case 12, a hollow cylindrical magnet 14 fitted loosely over the switch case 12 so as to be slidable along the switch case 12, and a coil spring 15 biasing the magnet 14 leftward.

Two terminals 13a and 13b of the magnetic reed switch 13 are connected through leads (not shown) to a detector (not shown).

A small annular spacing is formed between the magnet 14 and the switch case 12 such that the difference between the inner diameter L2 of the coil spring 15 and the outer diameter L1 of the magnet 14 is small, i.e., in a range of 0.1 to −0.05 mm (preferably, 0.1–0 mm). The magnet 14 has an annular spring stop 16 on the outer periphery thereof.

When the peripheral spacing between the magnet 14 and the coil spring 15 is in the range of 0.1 mm to −0.5 mm, the moving speed of the magnet 14 is reduced due to possible appropriate small friction and/or interference occurring therebetween and a substantially smooth movement of the magnet 14 due to shocks is ensured. If the peripheral spacing between the magnet 14 and the coil spring 15 exceeds 0.1 mm which is an upper limit, the moving speed of the magnet 14 would not be reduced, whereas if the peripheral spacing between the magnet 14 and the coil spring 15 is smaller than −0.05 mm which is a lower limit, the friction and/or interference between the coil spring 15 and the magnet 14 would increase and the magnet would be stopped.

Figure 4:
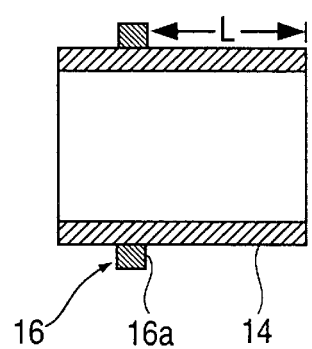
FIG. 4 is a cross-sectional view of a magnet of the FIG. 3 sensors with a spring stop.
Figure 5:
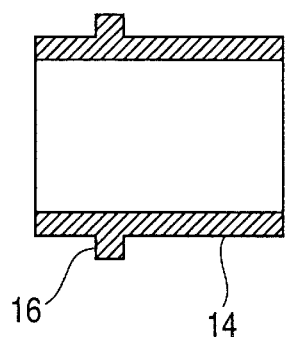
FIG. 5 is a cross-sectional view of a modification of the FIG. 4 magnet.

The magnet 14 is composed, for example, of a bond magnet which is made of a magnetic body of strontium ferrite and a nylon resin covering the magnet. As shown in FIG. 4, the annular spring stop 16 is bonded with an adhesive to the outer periphery of the magnet 14. The spring stop 16 has a small volume and hardly or never influences the magnetic flux of the magnet 14. Thus, it may be made of either a magnetic or a non-magnetic material. A nylon resin is preferred from a standpoint of adhesiveness. The coil spring 15 is fitted over the magnet 14 and abuts at one end on a side 16a of the spring stop 16 so that the magnet 14 is biased leftward to abut a stop 12a provided at the left-hand end on the switch case 12. As shown in FIG. 5, the spring stop 16 may be integral with the magnet 14.

The distance L between the side 16a of the spring stop 16 and the right-hand end of the magnet 14 is selected so as to be slightly longer than the completely compressed axial length of the coil spring 15. In FIG. 5, the spring stop 16 is disposed slightly to the left of the midpoint of the axial length of the magnet 14. Thus, when the magnet 14 is moved rightward due to shocks, the magnet 14 abuts on a stop 12b on the other (right-hand) side of the switch case 12 without the coil spring 15 being completely compressed.

When a vehicle to which such shock sensor 10 is attached is at a stop or travels at regular speeds, the shock sensor 10 is subjected to little high acceleration. Thus, the magnet 14 has abutted the stop 12a at the left-hand end of the switch case 12 by the tension of the coil spring 15.

Thus, the magnet 14 has deviated in midpoint to some extent from the magnetic reed switch 13 in the switch case 12. Thus, the contacts of the magnetic reed switch 13 are not influenced by the magnetic force and are maintained in the off state.

When the vehicle is involved in an accident, the shock sensor 10 is subjected to shock. As shown by arrow A of FIG. 3, the magnet 14 is subjected to a considerably high negative acceleration and is subjected to an inertial force directing rightward relative to the switch case 12 on the basis of the inertial mass thereof.

Thus, the magnet 14 moves rightward relative to the switch case 12 against the tension of the coil spring 15. When the magnetic force of the magnet 14 acting on the contacts of the magnetic reed switch 13 exceeds a predetermined value, the contacts of the magnetic reed switch 13 are turned on by the magnetic force of the magnet 14.

Thereafter, when the vehicle stops and the acceleration of the magnet 14 decreases below the predetermined value, the magnet 14 cannot withstand the tension of the coil spring 15. Thus, the magnet 15 is moved leftward relative to the switch case 12 by the tension of the coil spring 15 to return to its initial position.

When the magnetic force of the magnet 14 acting on the contacts of the magnetic reed switch 13 decreases below the predetermined value in this case, the contacts of the reed switch 13 are turned off or opened.

In this way, the magnetic reed switch 13 is maintained in the on state only for the time duration from its turning on to its turning off. The on state of the magnetic reed switch 13 is detected by the detector (not shown) connected to the magnetic reed switch 13, so that the air bags and/or seat belt systems are activated to ensure the safety of the driver and passengers in the vehicle. In the present embodiment, the spacing between the coil spring 15 and the magnet 14 disposed coaxially within the coil spring 15 is very small, so that when the magnet 14 moves, small friction or interference will occur between the outer peripheral surface of the magnet 14 and the inner peripheral surface of the coil spring 15. Thus, the moving speed of the magnet is slightly reduced, so that the on time duration is prolonged. Thus, the air bags and/or seat belt systems are accurately activated. The on time duration (35–45 milliseconds) is longer than the conventional on time duration (18–30 milliseconds).

On-time durations were measured using magnets MG1 and MG2 having outer diameters, for example of 8.85 and 8.58φ, respectively, as the magnet 14, and phosphor bronze coil springs SP1 and SP2 having inner diameters, for example of 8.94 and 8.83φ, respectively, as the coil spring 15, and are described below.

First, in the combination of magnet MG1 and coil spring SP1, the difference between the outer diameter of the magnet and the inner diameter of the coil spring was 0.09 mm and five measured on-time durations were 36.3, 36.0, 34.8, 35.4, and 36.3 milliseconds.

In the combination of magnet MG1 and coil spring SP2, the difference between the outer diameter of the magnet and the inner diameter of the coil spring was –0.02 mm and five measured on-time durations were 41.7, 41.4, 41.1, 39.9, and 40.8 milliseconds.

In the (conventional) combination of magnet MG2 and coil spring SP1, the difference between the outer diameter of the magnet and the inner diameter of the coil spring was 0.36 mm and five measured on-time durations were 28.8, 29.1, 28.8, 29.4 and 29.1 milliseconds.

Thus, it will be seen that the former two measured results involved in the present invention have longer on-time durations compared to the latter prior art.

While in the above described embodiment the magnet 14 is illustrated as being constructed so as to also function as a moving member, it may be attached to another annular moving member inserted longitudinally and slidably in the switch case 12.

The above-mentioned inventive arrangement is simple compared to the conventional sensor in that it includes a combination of the conventional shock sensor, an additional spring stop and a moving member having a different diameter from that of the conventional shock sensor. Thus, it will be made at a reduced cost compared to the conventional ones.

When the distance from the coil spring side end of the spring stop to the opposite end of the moving member from the spring stop is selected longer than the axial length of the completely compressed coil spring, the number of turns of the spring involved in possible friction occurring during the movement of the moving member will increase. Thus, the friction and hence the on-time duration increase to thereby ensure the operation of safety devices and systems for the driver and passengers in the vehicle, such as the air bags and/or seat belts.

A second preferred embodiment of the inventive shock sensor will be described next with reference to FIGS. 6, 7 and 8. FIG. 7 shows a magnet 14 with an annular spring stop 16 bonded to the outer periphery of the magnet 14, whereas FIGS. 8A, B and C each are an enlarged cross-sectional view of a magnet 14 and an annular radial projection 14a integral with the magnet 14.

The magnet 14 is provided with the annular radial projection 14a on the outer periphery thereof at the opposite end of the magnet 14 from the stop 16. The radial extension of the radial projection 14a is selected such that the difference between its outer diameter L3 and the inner diameter L2 of the coil spring 15 is very small. For example, in this embodiment, the difference is set at a value in a range of 0.1 to –0.05 mm (preferably 0.1–0 mm). The radial projection 14a may be made, for example, of a rigid synthetic resin bonded to the magnet 14. Alternatively, the magnet may have appropriate end coating, a slightly deformed end due to melting, or fins produced on the end of the magnet by a mold for the magnet.

Figure 8A:
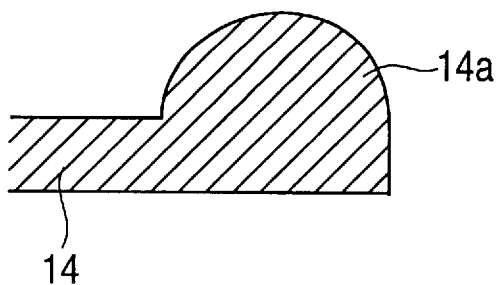
FIGS. 8A, B and C each are an enlarged cross-sectional view of a modification of an annular radial projection of the FIG. 6 magnet.
Figure 8B:
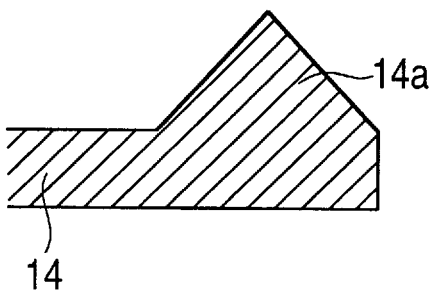
Figure 8C:
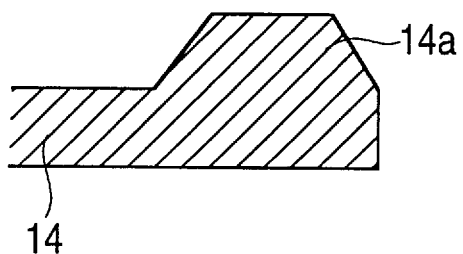
Figure 9:
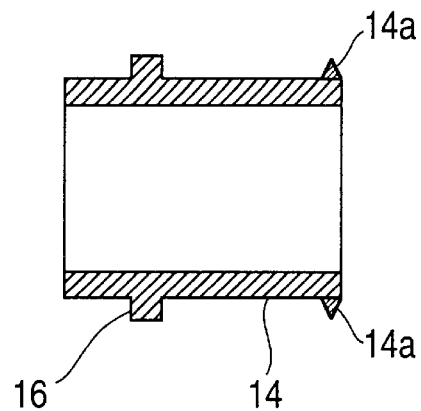
FIG. 9 is a longitudinal cross-sectional view of the magnet of FIG. 6 which has an annular radial projection.

In order to prevent the outer periphery of the radial projection 14a from being caught strongly by and engaged with the coil spring 15 when the magnet 14 (moving member) moves, the radial projection may decrease radially outward in axial cross section, i.e. take the form of a semicircle of FIG. 8A, a triangle of FIG. 8B, or a trapezoid of FIG. 8C.

Figure 1:
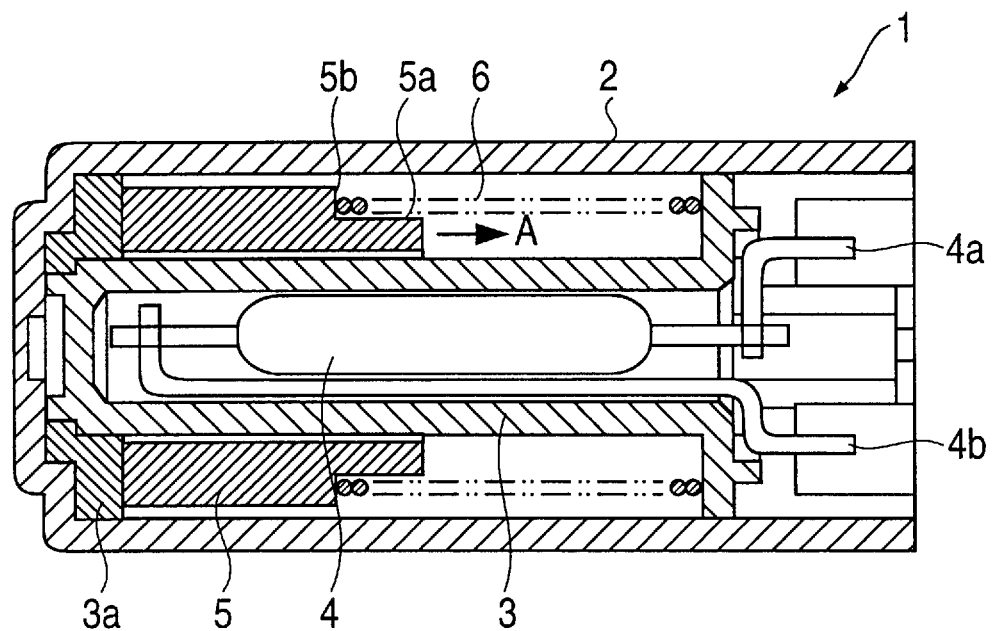
FIG. 1 is a longitudinal cross-sectional view of a conventional shock sensor.
Figure 2:
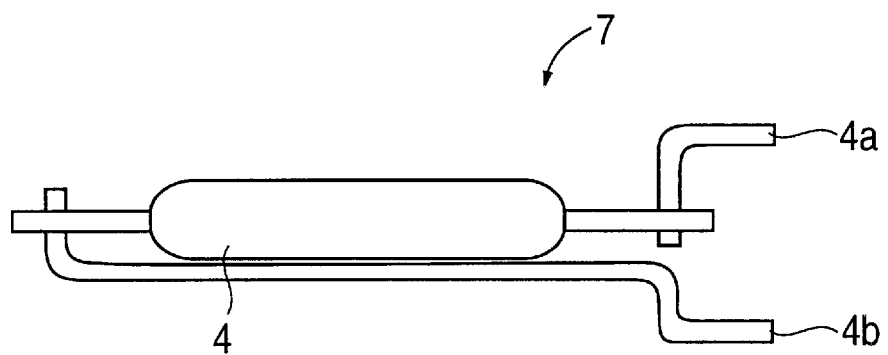
FIG. 2 is a side view of a magnetic reed switch assembly of the shock sensor of FIG. 1.

The outer diameter of the magnet 14 excluding the radial projection 14a may be selected so as to be substantially the same as the shoulder 5a of the conventional shock sensor 1 of FIG. 1.

Since the spacing between the inner diameter L2 of the coil spring 15 and the outer diameter L3 of the radial projection 14a on the magnet is in a range of 0.1 to –0.05 mm, the moving speed of the magnet 14 is reduced due to possible friction and/or interference occurring therebetween, and relatively smooth movement of the magnet 14 due to shocks is not impaired because the friction between the magnet 14 and the coil spring 15 is not so large. If the spacing between the inner diameter L2 of the coil spring 15 and the outer diameter L3 of the radial projection 14a exceeds an upper limit of 0.1, the moving speed of the magnet 14 would not be reduced, and if the spacing between the inner diameter of the coil spring 15 and the outer diameter of the radial projection 14a is smaller than a lower limit of –0.05 mm, the smooth movement of the magnet 14 would be impaired.

As just described above, since in the embodiment the spacing between the radial projection 14a on the magnet and the coil spring 15 coaxial with the magnet is small, small friction and/or interference may occur between the radial projection 14a and the coil spring 15 when the magnet 14 moves. Thus, the moving speed of the magnet 14 is slightly reduced due to such friction and/or interference, so that the on-time duration is prolonged and the air bags and/or seat belt systems operates accurately.

Figure 10A:
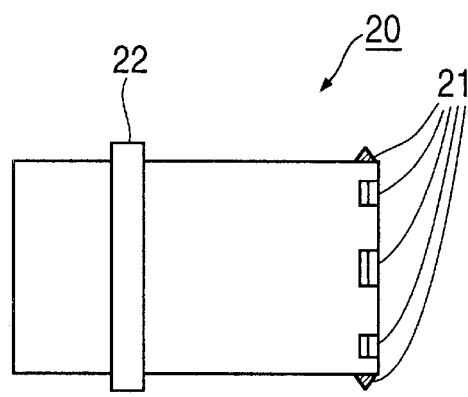
FIGS. 10A and B show the side and end views, respectively, of a magnet with a plurality of spot-type radial projections.
Figure 10B:
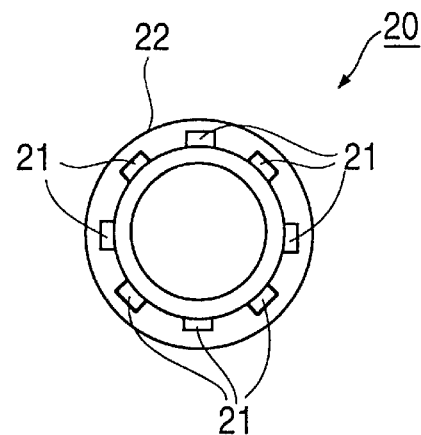

FIGS. 10A and B show a magnet 20 as the moving member in another embodiment of the inventive shock sensor. In FIGS. 10A and B, the magnet 20 takes the form of a hollow cylinder similar to that of FIG. 6. The magnet has a plurality of (in this embodiment, 8) spot-type radial projections 21 arranged at equal intervals around the outer periphery thereof at its right-hand end, and a spring stop 22 on the outer periphery thereof near its left end.

Also, in this case, the difference between the inner diameter of the coil spring 15 and the outer diameter of the plurality of spot-type radial projections 21 is set at a small value; i.e., in the range of 0.1 to −0.05 mm.

Figure 6:
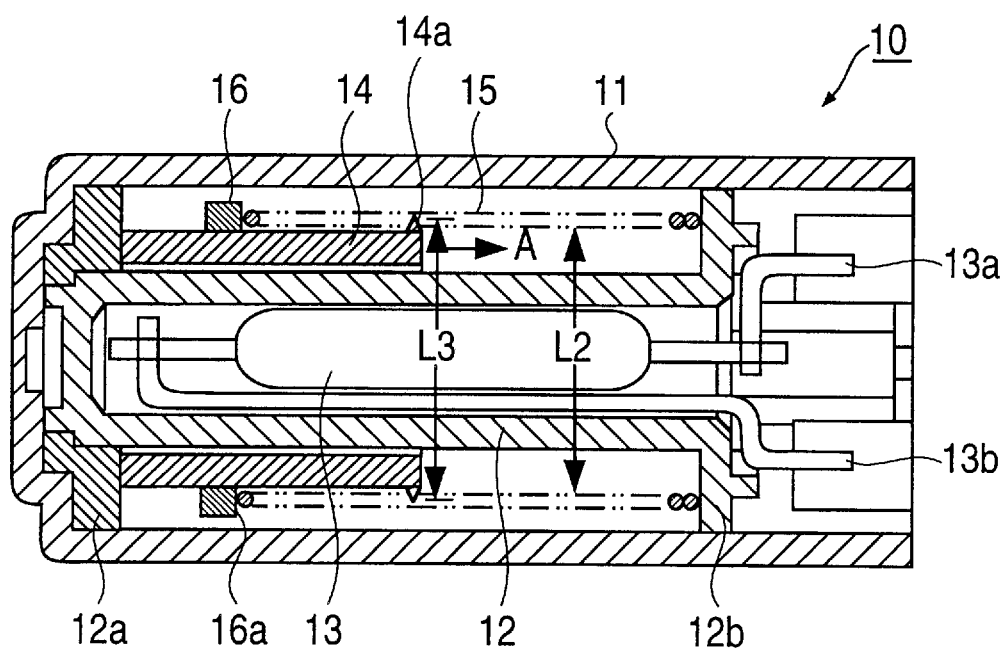
FIG. 6 is a longitudinal cross-sectional view of a second embodiment of the inventive shock sensor.
Figure 7:
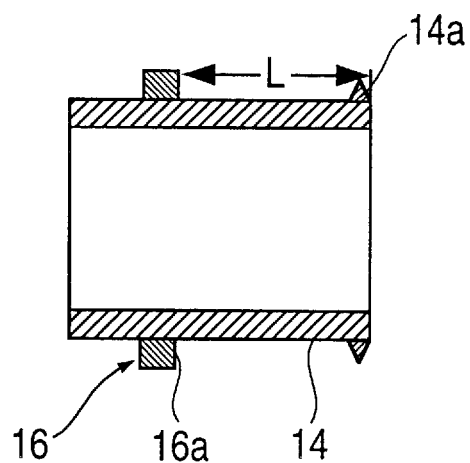
FIG. 7 is a cross-sectional view of a magnet of the FIG. 6 sensor.

Thus, as with the radial projection 14a in FIG. 6, small friction and/or interference will occur between the radial projections 21 on the outer periphery of the magnet 20 and the coil spring 15 when the magnet 20 moves to thereby slightly reduce the moving speed of the magnet 20, and hence to prolong the on-time duration and to operate the air bags and/or seat belt systems accurately.

Since the arrangement of this embodiment is simple, in that it includes the combination of the conventional shock sensor, the spring stop and the plurality of radial projections, it is made at a reduced cost.

Figure 11:
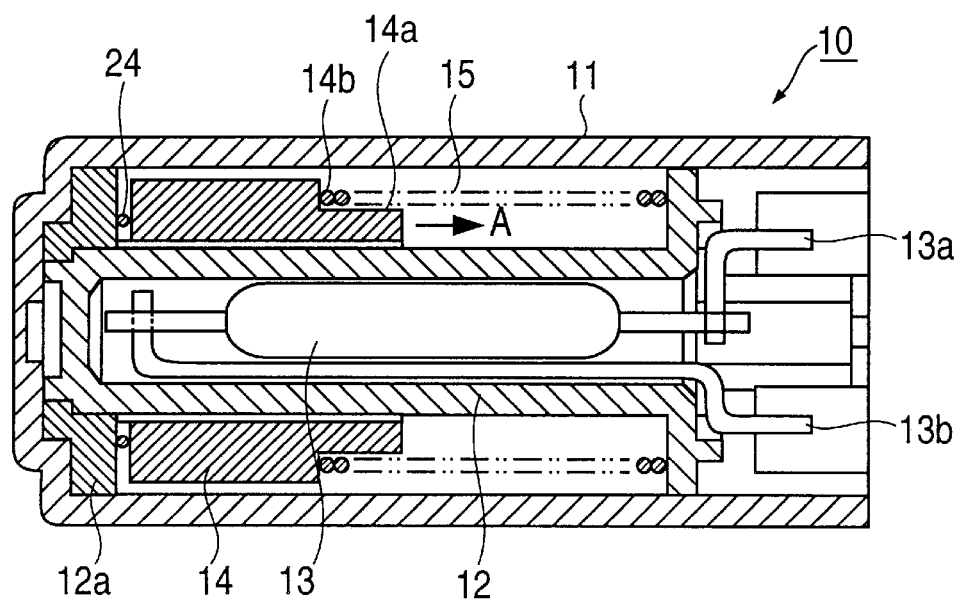
FIG. 11 is a longitudinal cross-sectional view of a third embodiment of the inventive shock sensor.

A third embodiment of the inventive shock sensor will be described with reference to FIG. 11. This embodiment includes the conventional shock sensor 1 of FIG. 1, and a spacer 24 provided between the magnet 14 and the stop 12a.

Figure 12:
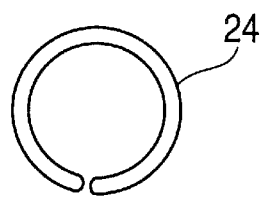
FIG. 12 is a front view of an example of a spacer for use in the shock sensor of FIG. 11.
Figure 13:
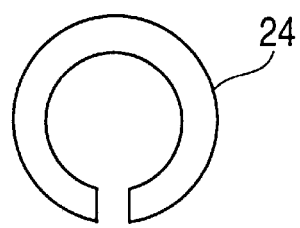
FIG. 13 is a front view of a second example of the spacer for use in the shock sensor of FIG. 11.

The spacer 24 has an appropriate axial dimension or selected thickness. For example, it may take the form of a C-like ring made of a metal wire of phosphor bronze or stainless steel of FIG. 12 or a C-like washer of metal or non-magnetic material (for example, a resin) of FIG. 13.

In the case of the C-like metal wire ring, any commercially available wire may be used, so that a spacer 24 having a desired size is easily obtained at low cost. When the spacer 24 is a C-like washer, it may be easily molded of a desired thickness at low cost from any one of commercially available molds.

In the case of the spacer 24 being made of a magnetic material, it is drawn magnetically by the magnet 14 and moved along with the magnet. Therefore, the spacer 24 does not freely move to thereby hinder a smooth movement of the magnet 14.

The size of the spacer 24 is selected such that its outer and inner diameters are smaller and larger, respectively, than the outer diameters of the magnet 14 and the switch case 12, respectively.

Since, in the present embodiment, the spacer 24 is provided between the magnet 14 and the stop 12a, the moving distance of the magnet 14 from its original position to a point where the magnetic reed switch 13 is turned on is adjusted appropriately by the spacer 24. Thus, without redesigning other parts, for example, the coil spring 15, the desired turn-on position is obtained by the adjustment. Thus, a high accuracy rise time is set, even if it is relatively short.

The adjustment of the turn-on position in the shock sensor 10 is made as follows: First, the coil spring 15, and the magnet 14 are fitted over the switch case 12, the stop 12a is then attached fixedly to the switch case 12, the magnetic reed switch assembly, in which the magnetic reed switch 13 is attached to the terminals 13a and 13b, is then inserted into the switch case 12 and spot-welded to the terminal frame of the switch case 12.

In this state, external shocks are imparted to the shock sensor. On the basis of this result, an appropriate moving distance of the magnet 14 from its initial position to the position where the magnetic reed switch 13 is turned on is obtained, and an appropriate axial thickness of the spacer 24 is selected such that the appropriate moving distance is finely adjusted. The spacer 24 having this axial thickness is provided between the magnet 14 and stop 12a to terminate the turn-on point adjustment.

Thus, by such adjustment, the turn-on point setting is achieved and a high accuracy rise time is set, even when the rise time is short. Re-adjustment is facilitated.

In order to make a turn-on point adjustment which reduces the moving distance of the magnet 14, a spacer 24 having an appropriate axial thickness is inserted in position. Conversely, in order to make a turn-on point adjustment which increases the moving distance of the magnet 14, a spacer 24 having a predetermined axial thickness is inserted temporarily, an impact test is made, the spacer 24 is then replaced with another spacer having an appropriate axial thickness, or removed on the basis of the result of the impact test, to thereby make an accurate turn-on point adjustment. When the spacer 24 is a C-like washer, a plurality of such washers may be inserted so as to obtain a desired whole spacer thickness to make the accurate turn-on point adjustment.

As described above, the spacer is provided between the moving member and the stop. By selecting a spacer having a desired axial thickness or a number of spacers whose total thickness is a desired one, the position of the moving member relative to the magnetic reed switch is adjusted.

Thus, the moving distance of the moving member from its initial position to the position where the magnetic reed switch is turned on when subjected to shocks is adjusted appropriately. By using the spacer with an appropriate axial thickness, the turn-on point adjustment is achieved easily.

What is claimed is:

1. A shock sensor, comprising:
   a magnetic reed switch extending in a direction in which shocks are detected;
   a moving member movable along the magnetic reed switch due to the shocks and capable of imparting a magnetic force to turn on the magnetic reed switch;
   a biasing member to normally urge the moving member toward one side of the magnetic reed switch; and
   an adjuster to adjust when the magnetic reed switch is on, wherein the adjuster reduces a speed at which the moving member moves, and,
   wherein the biasing member comprises a coil spring contacting the moving member;
   the moving member comprises a spring stop provided fixedly on an outer periphery of the moving member, with the coil spring abutting the spring stop; and
   the adjuster comprises interaction portions on the coil spring and the moving member which form a small space between the coil spring and the moving member.

2. A shock sensor according to claim 1, wherein the spring stop is bonded to the moving member.

3. A shock sensor according to claim 1, wherein the spring stop is integral with the moving member.

4. A shock sensor according to claim 1, wherein a distance between the spring stop and an end of the moving member opposite from the spring stop is greater than a completely compressed axial length of the coil spring.

5. A shock sensor according to claim 1, wherein a difference between an inner diameter of the coil spring and an outer diameter of the moving member is in a range of 0.1 to −0.05 mm.

6. A shock sensor according to claim 1, wherein the adjuster comprises a radial projection provided on an outer periphery of the moving member at an end of the moving member opposite from the spring stop so as to form a small spacing between the coil spring and the radial projection.

7. A shock sensor according to claim 6, wherein the radial projection comprises a continuous annular projection.

8. A shock sensor according to claim 6, wherein the radial projection comprises a plurality of spaced, radial projections provided at equal angles around an end of the moving member.

9. A shock sensor according to claim 6, wherein the radial projection has a shape gradually decreasing radially outward.

10. A shock sensor according to claim 9, wherein the radial projection takes the form of one of a semicircle, a triangle and a trapezoid.

11. A shock sensor according to claim 6, wherein a distance between the spring stop and an end of the moving member opposite from the spring stop is more than a completely compressed axial length of the spring.

12. A shock sensor according to claim 6, wherein a space between an inner diameter of the coil spring and an outer diameter of the radial projection is selected in a range of 0.1 to −0.05 mm.

13. A shock sensor 1, comprising:

a magnetic reed switch extending in a direction in which shocks are detected;

a moving member movable along the magnetic reed switch due to the shocks and capable of imparting a magnetic force to turn on the magnetic reed switch;

a biasing member to normally urge the moving member toward one side of the magnetic reed switch; and an adjuster to adjust when the magnetic reed switch is on, wherein the adjuster adjusts when the magnetic reed switch is turned on, and wherein the adjuster comprises a spacer between the moving member and a switch case stop.

14. A shock sensor according to claim 13, wherein the spacer has an axial thickness related to the desired adjustment of when the magnetic reed switch is turned on.

15. A shock sensor according to claim 13, wherein the spacer comprises a C-like ring made of a metal wire having a resiliency.

16. A shock sensor according to claim 13, wherein the spacer comprises a C-like washer.

17. A shock sensor according to claim 13, wherein the spacer comprises a magnetic material and is magnetically drawn by the magnetic force to the moving member.

\* \* \* \* \*

UNITED STATES PATENT AND TRADEMARK OFFICE
CERTIFICATE OF CORRECTION

PATENT NO.: 5,770,792
DATED : June 23, 1998
INVENTOR(S): Tsutomu NAKADA et al.

It is certified that error appears in the above-identified patent and that said Letters Patent is hereby corrected as shown below:

Column 3, line 39, after "annular" insert --and--;

Column 4, line 19, after "changed" insert a comma --,--.

Column 5, line 38, change "projections." to --projections;--.

Column 11, line 15, delete "1".

Signed and Sealed this

Tenth Day of November 1998

Attest:

BRUCE LEHMAN

Attesting Officer

Commissioner of Patents and Trademarks